United States Patent [19]
Thompson

[11] Patent Number: 5,433,531
[45] Date of Patent: Jul. 18, 1995

[54] ENGINE BEARING SURFACE TREATMENT

[75] Inventor: Ronald J. Thompson, Howell, Mich.

[73] Assignee: Federal-Mogul Corporation, Southfield, Mich.

[21] Appl. No.: 125,085

[22] Filed: Sep. 21, 1993

[51] Int. Cl.$^6$ .......................... F16C 33/24; F16C 9/02
[52] U.S. Cl. .................................. 384/276; 384/282; 384/294; 384/625
[58] Field of Search ............... 384/625, 276, 280, 282, 384/294, 297, 912, 913

[56]  References Cited
U.S. PATENT DOCUMENTS

| | | | |
|---|---|---|---|
| 3,361,502 | 1/1968 | Weinkamer et al. | 384/294 |
| 4,125,637 | 11/1978 | Tanner | 384/625 X |
| 4,334,926 | 6/1982 | Futamura et al. | 384/913 X |
| 4,789,607 | 12/1988 | Fujita et al. | 384/912 X |
| 4,900,639 | 2/1990 | Hodes et al. | 384/913 X |

Primary Examiner—Thomas R. Hannon
Attorney, Agent, or Firm—Lawrence J. Shurupoff

[57]  ABSTRACT

A dispersion of hard, wear-resistant particles such as aluminum oxide is embedded within a shaft-engaging surface of a bearing such that the service life of a shaft and bearing assembly is extended. The relatively hard aluminum oxide particles exert a polishing action on the shaft surface to improve the wear resistance and seizure resistance of the bearing and shaft system. A tumbling barrel, vibratory bowl, air jet, brush or similar apparatus can be used to apply and embed tumbling media particles within the shaft-engaging surface. During the application period, aluminum oxide particles are transferred to the bearing member surfaces by the sliding, rubbing contact between the abrasive bodies and the individual bearing members.

7 Claims, 2 Drawing Sheets

ENGINE BEARING SURFACE TREATMENT

BACKGROUND OF THE INVENTION

1. Field of the Invention

The present invention relates in general to engine bearings and, in particular, to seizure-resistant treatments for such bearings.

2. Description of Prior Developments

Engine bearings are presently being subjected to increased engine speeds, increased loading at all engine speeds, higher thrust loads and thinner oil films due to the operating characteristics of many new high performance engines. In some cases, the extreme thrust loads can lead to premature failure of the bearing thrust flanges. Failure may take the form of excessive bearing wear or bearing seizure.

Accordingly, a need exists for an engine bearing which resists seizure and wear and thereby reduces the possibility of premature engine failure.

SUMMARY OF THE INVENTION

The present invention concerns a bearing and a method of treating the bearing wherein a bearing liner surface which is formed on a steel substrate is provided with a dispersion of hard particles such as aluminum oxide. The hard particles are appreciably harder than the steel or cast iron shaft which is supported by the bearing. During engine operation, the hard particles act as a polishing agent to remove minor roughness on machined shaft surfaces and at the same time prevents micro seizures.

The polished surface of the shaft rides on the relatively hard particles without any appreciable wear of the bearing or shaft surfaces. During start-up periods, when a lubricant film may not yet be established at the shaft-bearing interface, there is essentially no wear in spite of the absence of a complete lubricant film.

Aluminum oxide may be applied in the form of discrete particles of aluminum oxide with each particle having a particle size of about three microns up to approximately 175 microns with particle population densities of about 20 to 250 particles per square millimeter (particles/mm$^2$). The relatively small size particles are able to exert a polishing action on the moving surface of the shaft without forming grooves or scratches in the shaft. The small size of the aluminum oxide particles is also beneficial in that each particle can be virtually fully embedded into the relatively soft running surface of the bearing with only a relatively small energy expenditure required to achieve an embedding action on any given particle.

The various sized aluminum oxide particles and clusters of such particles are small enough so as to be in a substantially common plane on the bearing. That is, the exposed face of each aluminum oxide particle is in a common plane with the neighboring aluminum oxide particles so that there is minimal roughness or variation in the height of the bearing surface between any two points.

The aluminum oxide particles do not necessarily fully cover the entire surface of the bearing. An effective bearing surface can be achieved with an aluminum oxide particle coverage of only about five percent of the bearing surface area, provided the oxide particles are relatively evenly distributed on the bearing substrate surface.

With such a dispersion of the aluminum oxide particles on the bearing substrate surface, each aluminum oxide particle can be individually and substantially fully embedded in the substrate surface so that each particle is tightly, mechanically held by the substrate material. The individual aluminum oxide particles are thus effectively retained against dislodgement by frictional contact with a rotating steel or cast iron shaft surface.

Dispersion of the aluminum oxide particles on the bearing substrate may be controlled so that the dispersion will have a uniform one-particle thickness along the substrate surface. A relatively uniform and thin oxide layer contributes toward bearing surface smoothness.

The aluminum oxide dispersion may be applied to the bearing member by a tumbling procedure. Tumbling of metal workpieces is commonly used for such purposes as cleaning, descaling, deburring, burnishing and shining various workpieces. In the present invention, the tumbling procedure is also used to form a layer of dispersed aluminum oxide particles on the surface of a bearing member. The bearing member can be of almost any size and shape, e.g., the shapes or configurations commonly used to form sleeve bearings, split bearings, and flanged engine bearings.

The tumbling operations are carried out with agglomerated abrasive media bodies formed out of finely divided aluminum oxide particles or powders dispersed in a binder. During the tumbling operation, the abrasive bodies strike the loose bearing members such that aluminum oxide particles forcibly rub against the bearing member surfaces. Individual aluminum oxide particles are thus dislodged and transferred from the abrasive bodies to the bearing member surfaces.

The quantity of aluminum oxide particles transferred to each bearing member is believed to be a function of tumbling time and speed, the characteristics of the abrasive media bodies and other factors. The particle size of the aluminum oxide particles embedded within the bearing members is believed to be a function of the particle size of the aluminum oxide powders used to form the abrasive media bodies. Very thin oxide dispersion layers can be achieved by forming the abrasive media bodies out of small sized aluminum oxide powders.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
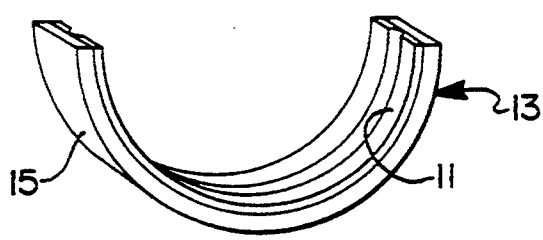
FIG. 1 is a perspective view of a steel backed bimetallic sleeve bearing to which the present invention may be applied.
Figure 2:
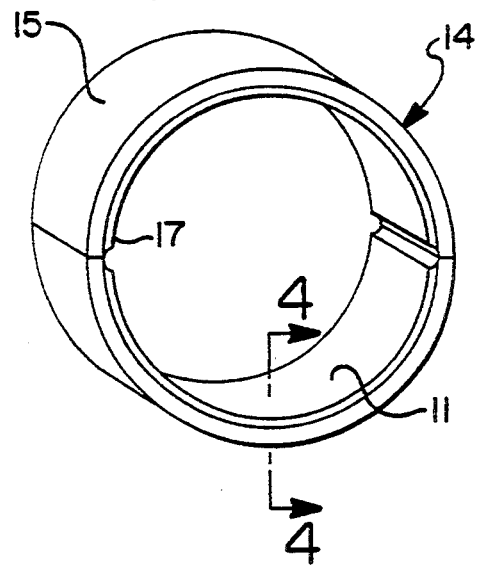
FIG. 2 illustrates a split journal bearing to which the present invention can be applied.
Figure 3:
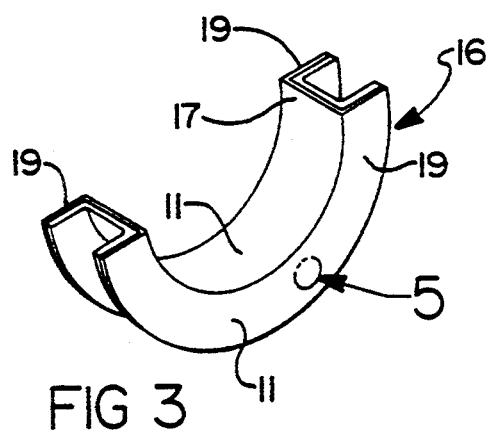
FIG. 3 is a perspective view of an engine crankshaft half bearing to which the present invention may be applied.

FIGS. 1 through 3 show various types of ready to install bimetallic sleeve bearing members produced according to the present invention. In FIG. 1, a relatively soft shaft engagement lining layer 11 of a sleeve bearing 13 is bonded to a relatively hard reinforcing member such as steel backing layer 15 in a known fashion. The lining layer 11 is preferably formed of a layer of relatively soft anti-friction metal material such as an aluminum-lead alloy, an aluminum-tin alloy, babbitt, etc.

FIG. 2 depicts a split journal bearing 14 and FIG. 3 depicts a crankshaft half bearing 16 that is used both as a radial bearing and as a thrust bearing. Each sleeve type bearing in FIGS. 2 and 3 includes a semi-cylindrical radial bearing shell 17. In FIG. 3, two thrust bearing flanges 19 project radially from the bearing shell 17. In some applications only one thrust flange 19 is required.

In FIGS. 1 and 2, a dispersion of aluminum oxide particles is applied to the layers 11. In FIG. 3, aluminum oxide particles may be applied to either layer 11 or flanges 19 or to both surfaces such that an associated rotary shaft rides at least in part on the aluminum oxide. The aluminum oxide may be applied only to the surface of the shaft engagement lining layers 11 or only to flanges 19. Prior to application of the aluminum oxide particles, the shaft-engaging or running surfaces of the bearing members are finished by a final machining operation to a fine surface finish.

Figure 4:
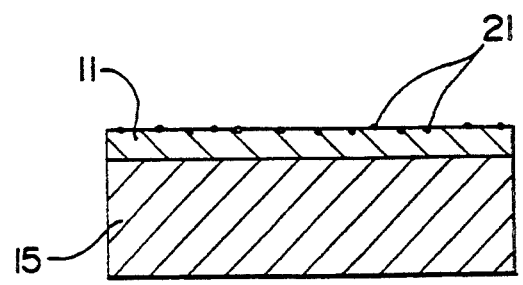
FIG. 4 is a sectional view taken through section lines 4—4 of FIG. 2.
Figure 5:
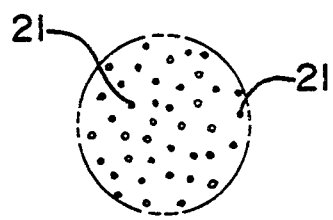
FIG. 5 is an enlarged fragmentary plan view of aluminum oxide particles dispersed on the surface of the bearing member of FIG. 3 using the FIG. 6 apparatus.

The aluminum oxide particles are applied as a dispersion of discrete particles embedded in the shaft engagement surfaces of lining layers 11. As shown in FIGS. 4 and 5, the small aluminum oxide particles 21 are dispersed in part on and in part slightly below the bearing surfaces so that individual particles are separated from one another. The aluminum oxide particles typically do not adhere to each other. In a preferred arrangement, each aluminum oxide particle 21 is relatively small, on the order of about one to ten microns.

An effective aluminum oxide layer may have a one-particle thickness without individual particles piled up in layers at different points along the substrate surface. A uniform layer or dispersion thickness is also promoted by having all of the oxide particles substantially small and approximately equal in size.

Dispersion of the aluminum oxide particles on the bearing lining layer 11 may be such that the oxide particles occupy only about as little as five to ten percent of the lining surface area, leaving about ninety to ninety-five percent of the bearing lining surface uncoated or exposed. Significantly higher densities increase the cost of applying the aluminum oxide particles. Also, the beneficial effects of hard particle impregnation may be lost at significantly higher densities. However, surface area coverings of up to twenty percent by the particles is considered economical.

Depending on the process used to apply the hard particles such as aluminum oxide to the bearing lining surface, the individual particles may be fully embedded into the lining material or only partially embedded in the lining material. In any event, the small size of each particle is such that the exposed faces of the embedded particles will be essentially on a common plane so that the associated shaft is in sliding contact with all or most of the aluminum oxide particles.

Aluminum oxide has a hardness approaching that of a ruby, i.e. it is appreciably harder than cast iron and steel. Normally, the interface between the shaft surface and the aluminum oxide will be occupied by a pressurized film of flowing lubricant. However, under start-up conditions or because of uneven loadings or eccentricity tolerances, some zones of the bearing-shaft interface may be starved of lubricant.

The aluminum oxide particles exert a polishing action on the shaft surface assuming sufficient pressure exists between the engaged surfaces. The polishing action eliminates minor peaks on the shaft surface such that the shaft surface smoothness is enhanced. The net effect is reduced wear of the shaft surface due to an increased contact area between the shaft and bearing member and improved resistance to seizure between the bearing and shaft.

The hard particle dispersion can be formed on the bearing lining surfaces in various different ways, e.g., by air blasting fine aluminum oxide powders against the bearing lining surface, or by rolling, stamping or brushing finely divided particles into the bearing surface. However, two particularly economical methods that have been found to produce a desired bearing product are barrel tumbling and vibratory bowl tumbling.

In the barrel tumbling method, a number of machined sleeve bearing members or the like is placed in a tumbling barrel together with a predetermined quantity of abrasive tumbling media bodies and, optionally, a predetermined volume of soap solution. Each abrasive media body is formed of finely divided aluminum oxide powder and held together with an adhesive binder.

Each abrasive body is preferably somewhat smaller than the individual bearing members. Abrasive bodies having dimensions of about three-eighth inch on a side have been used. Different abrasive body shapes have been used, including pyramid configurations, tetrahedron shapes and cylindrical pin shapes. The total volume of the abrasive bodies is larger than the total volume of the bearing members. Preferably, the total abrasive body volume is about four times the total bearing member volume.

The particle size of the aluminum oxide powders used to form the abrasive bodies is preferably relatively small, in the neighborhood of ten to fifty microns. The particle size is of some importance in that it largely determines the particle size of the individual oxide particles in the particle film or layer formed on the surfaces of the bearing members by the barrel tumbling operation.

Figure 6:
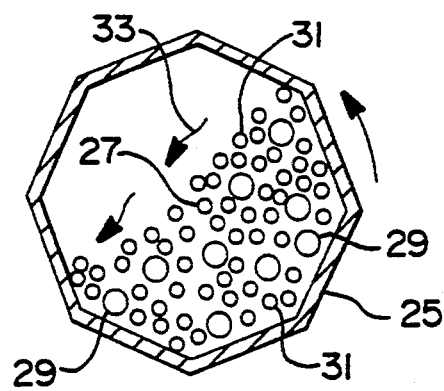
FIG. 6 diagrammatically shows a tumbling barrel that can be used to practice a method of forming a dispersion of aluminum oxide on any of the bearing members shown in FIGS. 1 through 4.

FIG. 6 schematically shows a representative tumbling barrel 25 within which the bearing members 29, abrasive media bodies 31, and soap solution are loaded. As the barrel rotates in the counterclockwise direction around horizontal axis 27, the individual bearing members 29 and abrasive media bodies 31 tumble or slide against one another as indicated by arrows 33 such that aluminum oxide particles are transferred from bodies 31 to the surfaces of bearing members 29 by abrasive rubbing actions of the abrasive bodies on the bearing members.

It has been found that the aluminum oxide particles become embedded in the bearing member lining surfaces as a reasonably even dispersion or distribution. The particles appear to separate from the abrasive bodies as discrete particles, as well as in agglomerations of particles. In general, the size of the particles in the abrasive media bodies carries forward to the particle size of the particles in the aluminum oxide films formed on the bearing members.

If the particle size in the abrasive body is relatively large, then the particle size in the deposited dispersion will likewise be relatively large. If the particle size used in the abrasive body is small, the particle size in the deposited dispersion will be correspondingly small. In one arrangement, the particle size used in the abrasive body 31 is no more than about ten microns. The oxide particle size in the deposited film has the same value, i.e. no more than ten microns. The particles apparently tend to separate from the abrasive body along the cleavage lines defined by the media binder material. In some cases, clusters of particles break away and become embedded in the bearing material along with individual particles.

The density of the particulate film or dispersion layer on the bearing members 29 is roughly proportional to the duration of the tumbling period and the tumbling speed. By increasing the duration of the tumbling period, the density of the particulate layer is increased proportionately but not the thickness. In one instance, a tumbling duration period of twenty minutes produced a satisfactory particulate density or surface area coverage. Higher tumbling speeds apparently produce increased particulate density up to the point where centrifugal force decreases the tumbling effect by keeping the bearing members or abrasive media bodies on the barrel surface. In one case, a tumbling speed of about one hundred seventy-five revolutions per minute produced a satisfactory product.

An examination was performed on flanged main engine bearings tumbled for 15 and 45 minutes and a loose thrust washer for the same engine tumbled for 30 minutes in a roto-barrel tumbler to estimate the range of particle sizes and the particle population density range (number of particles per mm$^2$) for conventional aluminum-lead bearing materials.

Segments of the thrust surfaces were mounted and polished for approximately 4 minutes to reveal the embedded aluminum oxide particles. The size range was determined by metallographic examination and measurement of the largest and smallest particles on three mounts. The largest single particle observed in the three mounts was 110 microns. The largest particle cluster was 140 microns in length. The smallest particles were about 3-5 microns in length. The majority of the particles fell within the 10 to 50 micron range.

The particle population density (number of particles per square millimeter) were determined by taking several photomicrographs of the polished surfaces and counting the number of particles in each photograph, averaging the results and dividing by the actual area shown in the photograph. The results were as follows:

|  | TUMBLE TIME | | |
| --- | --- | --- | --- |
|  | 15 Minutes | 30 Minutes | 45 Minutes |
| Average number of Particles/mm$^2$ | 55 | 120 | 160 |
| Standard Deviation | 24 | 21 | 16 |
| Approx. Surface Area Covered By Particles | 5% | 12% | 16% |

Tumbling can be effectively used to form thin, hard, wear-resistant dispersion layers of aluminum oxide particles on the surfaces of bearing members. Such surface treatment is retained on the bearing member surfaces solely by mechanically embedding aluminum oxide particles in the lining substrate. No supplemental adhesives or surface treatments are required.

The bearing member running surfaces should be finish-machined prior to tumbling in order to achieve a desired degree of surface smoothness and dimensional accuracy in the final product. Although engine bearings have been tumbled for removing burrs in the past, the lining has been subsequently machined so as to remove the surface layer of material within which the particles were embedded and thereby remove the benefit of any tumbling particles which may have been present before machining. Thus, final machining of the bearing surfaces which are to be provided with aluminum oxide particles should take place before, and not after, tumbling.

The bearing surfaces 11,19 shown in FIGS. 1-4 are adapted to be installed directly within a vehicle engine without subsequent machining or processing. With the described procedure, all of the bearing member lining surfaces are coated with particulate aluminum oxide. However, the only surface areas of consequence are the bearing surfaces in contact with the rotating shaft surfaces.

Figure 7:
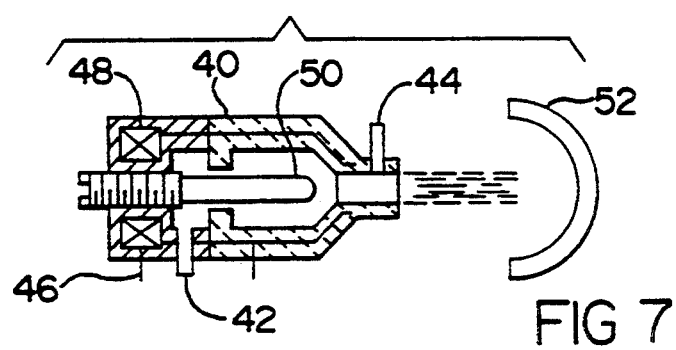
FIG. 7 schematically shows a plasma spray gun that can be used in practicing a method of the present invention.

FIG. 7 shows a conventional plasma spray gun 40 for use in applying particulate aluminum oxide particles on the shaft-engagement surfaces of a bearing member. The conventional plasma spray gun includes a housing having a pressurized plasma gas inlet 42, an aluminum oxide powder inlet 44, and electrical lead wiring 46 for supplying electrical power to a coil 48. Electrical energization of the coil provides a high voltage condition at an electrode 50 such that an arc is generated for heating the plasma gas to an elevated temperature sufficient to melt or sinter the aluminum oxide particles as they are discharged from the gun onto the surface of the workpiece 52.

It is believed that a relatively uniform, thin aluminum oxide film could be produced on the running surfaces of bearing members using a plasma spray gun of the type shown in FIG. 7. Depending on the size and configuration of the bearing member surface, it would probably be necessary to move the gun and/or workpiece in a controlled pattern during the spraying operation in order to achieve complete coverage of the bearing surface.

As previously noted, the barrel tumbling apparatus depicted schematically in FIG. 6 represents the preferred method of applying a thin aluminum oxide film on the sleeve bearing members.

Obviously, numerous modifications and variations of the present invention are possible in the light of the above teachings. It is therefore to be understood that within the scope of the appended claims, the invention may be practiced otherwise than as specifically described herein. For example, hard particles other than aluminum oxide may be used to carry out the invention. In those cases where welding or brazing is required to assemble a sleeve bearing, silicon carbide particles may be employed. Ceramic particles also may be used in particular applications.

What is claimed is:

1. A finished sleeve bearing comprising a backing layer of steel and a lining layer formed of an anti-friction material which defines a shaft engagement surface, the improvement comprising a polishing agent externally applied through said shaft engagement surface and extending only within a thin surface layer beneath said shaft engagement surface, said polishing agent comprising a dispersion of hard abrasive particles within said thin surface layer and a dispersion of clusters of said hard abrasive particles held together with a binder and dispersed within said thin surface layer.

2. The bearing of claim 1, further comprising a shell portion and at least one thrust flange projecting radially from said shell portion.

3. The bearing of claim 2, wherein the polishing agent particles are no more than about 175 microns in size.

4. The bearing of claim 2, wherein the polishing agent particles occupy no more than about twenty percent of the shaft-engagement surface area.

5. The bearing of claim 2, wherein the polishing agent particles are mechanically embedded in the shaft-engagement surface.

6. The bearing of claim 2, wherein the polishing agent particles occupy approximately five to sixteen percent of the shaft-engagement surface area.

7. The bearing of claim 1, wherein said hard abrasive particles and said clusters of hard abrasive particles respectively comprise tumbling media particles and broken clusters of tumbling media particles held together with tumbling media binder.

* * * * *